(12) United States Patent
Vandewall et al.

(10) Patent No.: US 10,970,798 B2
(45) Date of Patent: Apr. 6, 2021

(54) AIRCRAFT DINING SYSTEMS AND METHODS

(71) Applicant: THE BOEING COMPANY, Chicago, IL (US)

(72) Inventors: Cynthia A. Vandewall, Snohomish, WA (US); Blake Lane, Cincinnati, OH (US); Craig Vogel, Cincinnati, OH (US); Leigh Ann Popik, Cincinnati, OH (US); Kristen McIntyre, Cincinnati, OH (US); Ryan Reese, Cincinnati, OH (US); Alberto De Icaza, Cincinnati, OH (US)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 16/167,633

(22) Filed: Oct. 23, 2018

(65) Prior Publication Data

US 2020/0126170 A1 Apr. 23, 2020

(51) Int. Cl.
*G06Q 50/12* (2012.01)
*G06Q 30/06* (2012.01)

(52) U.S. Cl.
CPC ......... *G06Q 50/12* (2013.01); *G06Q 30/0635* (2013.01); *G06Q 30/0641* (2013.01)

(58) Field of Classification Search
CPC . G06Q 50/12; G06Q 30/0635; G06Q 30/0641
USPC .................................................. 705/15
See application file for complete search history.

(56) References Cited

U.S. PATENT DOCUMENTS

| | | | | |
|---|---|---|---|---|
| 6,435,407 | B1 * | 8/2002 | Fiordelisi | G06Q 30/06 235/383 |
| 7,344,109 | B1 * | 3/2008 | Rezai | B64D 9/00 244/118.2 |
| 2014/0330603 | A1 * | 11/2014 | Corder | G05B 15/02 705/7.12 |
| 2016/0251101 | A1 * | 9/2016 | Kong | B65B 35/30 53/445 |
| 2017/0228837 | A1 * | 8/2017 | Porter | G06Q 30/0601 |
| 2017/0308098 | A1 * | 10/2017 | Yu | G05D 1/024 |
| 2018/0234707 | A1 * | 8/2018 | Pujia | H04N 21/4415 |
| 2019/0050951 | A1 * | 2/2019 | Goldberg | G05D 1/0276 |

* cited by examiner

*Primary Examiner* — Andrew Joseph Rudy
(74) *Attorney, Agent, or Firm* — The Small Patent Law Group LLC; Joseph M. Butscher

(57) ABSTRACT

An aircraft dining system and method are configured to allow a passenger for a scheduled flight of an aircraft to order one or more items from restaurants within an airport. The aircraft dining system includes an order fulfiller including an order fulfillment control unit that is configured to receive an order for an item from a restaurant within the airport from the passenger for the scheduled flight so that the item is delivered to the aircraft or an area proximate to the aircraft prior to the aircraft departing the airport. In at least one embodiment, an ordering device includes an ordering control unit that is configured to allow the passenger to submit the order.

49 Claims, 5 Drawing Sheets

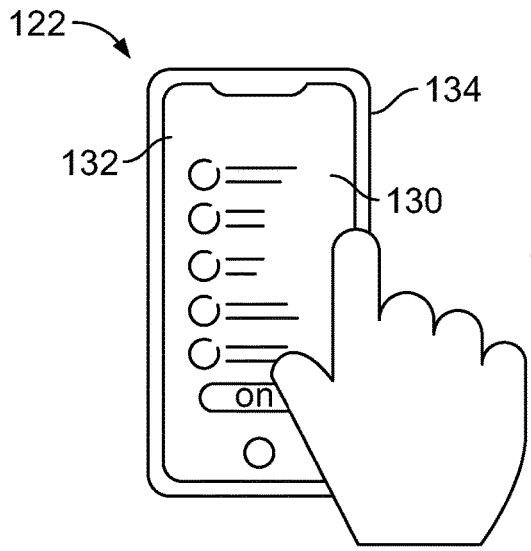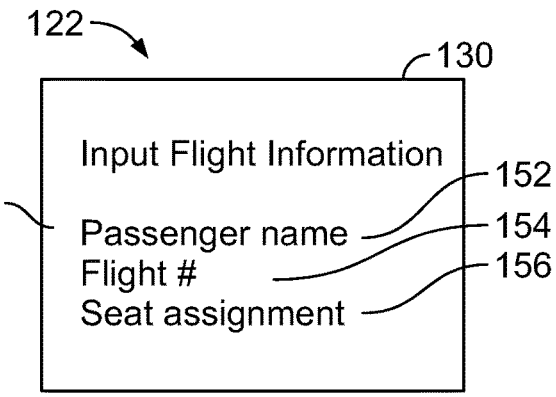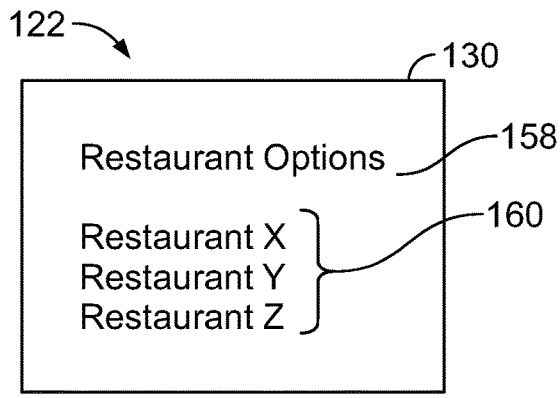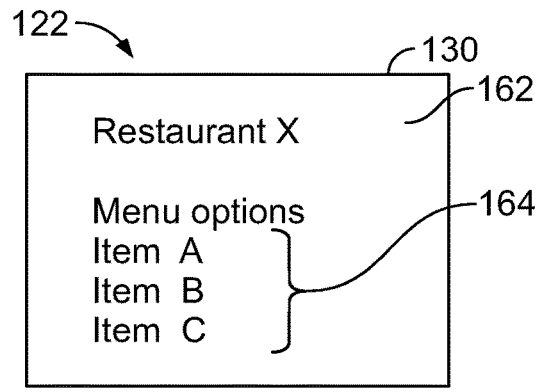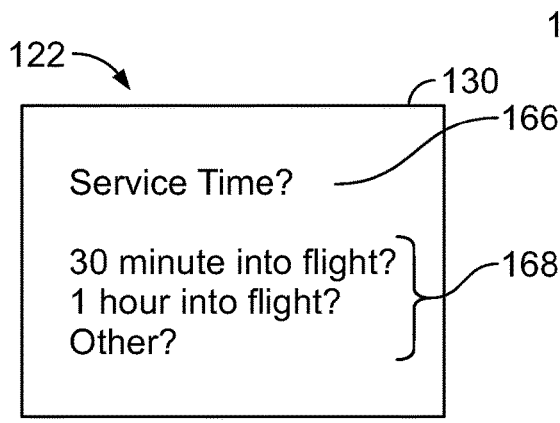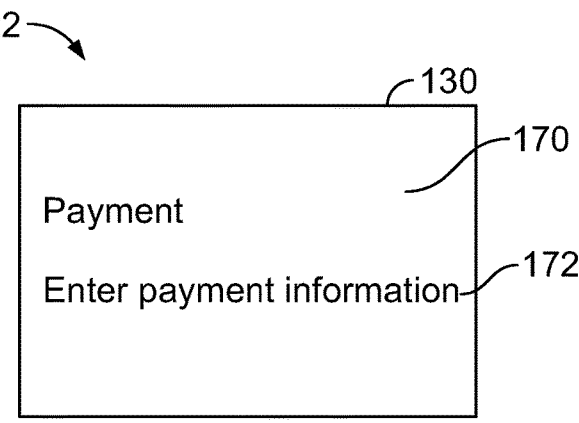
FIG. 3
FIG. 4
FIG. 5
FIG. 6
FIG. 7
FIG. 8

AIRCRAFT DINING SYSTEMS AND METHODS

FIELD OF THE DISCLOSURE

Embodiments of the present disclosure generally relate to systems and methods for dining aboard commercial aircraft, and more particularly to systems and methods for ordering and delivering meals to passengers of commercial aircraft.

BACKGROUND OF THE DISCLOSURE

Commercial aircraft transport passengers between locations. For example, an aircraft departs from a first airport and arrives at a second airport. During a flight, passengers may be provided food and beverage items, including meals, canned or bottled drinks, and the like. Typically, the aircraft operator provides a limited number of items for passengers to consume during a flight. As an example, flight attendants may offer passengers peanuts or other such snacks, along with a limited number of beverages. During certain longer flights, passengers may even be offered full meals.

Typically, catering companies contracted by airlines prepare meals for flight and transport them onto an aircraft. Passengers typically have limited food options and levels of customization onboard an aircraft. Flight attendants prepare the meals in galleys of the aircraft during a flight. For example, flight attendants may consult guidelines posted in galleys to prepare the meals and deliver them to certain passengers. The meals are generally served at pre-determined times during a flight.

A passenger onboard an aircraft may be given a very limited choice of meal options. For example, a flight attendant may ask passengers their choice of two or three meal options. If a desired meal is no longer available, the passenger is left to choose a less desirable meal.

As can be appreciated, passengers onboard an aircraft may not always be excited, enthused, or otherwise satisfied with the meal options being offered by the aircraft operator. Further, a flight attendant may take a considerable amount of time during a flight asking passengers their meal preferences, keeping track of such meal preferences, and subsequently preparing and serving the meals.

SUMMARY OF THE DISCLOSURE

A need exists for a system and a method for providing passengers aboard an aircraft with a greater number of food and beverage options during a flight. Further, a need exists for a system and a method for allowing passengers aboard an aircraft to select meals of their specific choosing. Additionally, a need exists for a system and a method for coordinating meals onboard on aircraft that allows flight attendants to perform various other tasks.

With those needs in mind, certain embodiments of the present disclosure provide an aircraft dining system that is configured to allow a passenger for a scheduled flight of an aircraft to order one or more items from restaurants within an airport. The aircraft dining system includes an order fulfiller including an order fulfillment control unit that is configured to receive an order for an item from a restaurant within the airport from the passenger for the scheduled flight so that the item is delivered to the aircraft or an area proximate to the aircraft prior to the aircraft departing the airport. The area proximate to the aircraft may be a gate within the airport. In at least one embodiment, the order fulfillment control unit is further configured to contact the restaurant to prepare the item and have the item delivered to the aircraft or the area proximate to the aircraft prior to the aircraft departing the airport.

The aircraft dining system may also include an ordering device that includes an ordering control unit that is configured to allow the passenger to submit the order. The ordering control unit is in communication with the order fulfillment control unit.

The ordering device may include a user input device coupled to the ordering control unit. The user input device is configured to allow the passenger to submit the order to the ordering control unit.

In at least one embodiment, the ordering device includes a display coupled to the ordering control unit. The ordering control unit may be configured to show a flight information screen on the display. The flight information screen is configured to prompt the passenger to input one or more of passenger name, flight number, or seat assignment.

The ordering control unit may be configured to show a restaurant option screen on the display. The restaurant option screen is configured to prompt the passenger to pick the restaurant from a plurality of restaurants within the airport.

The ordering control unit may be configured to show a menu options screen on the display. The menu options screen is configured to prompt the passenger to pick the item from one or more items.

The ordering control unit may be configured to show a service time screen on the display. The service time screen is configured to prompt the passenger to pick a preferred service time during the scheduled flight.

The ordering control unit may be configured to show a payment screen. The payment screen is configured to prompt the passenger to enter payment information.

In at least one embodiment, the restaurants are within a secured area of the airport.

A flight schedule database may store flight schedule data regarding the aircraft.

In at least one embodiment, the order includes passenger information, flight information, a choice of the restaurant, and a choice of the item offered by the restaurant. The order may also include a chosen service time for the item during a flight.

The order may be submitted when the scheduled flight is booked, such as by a passenger. The order may be submitted at the airport. The order may be submitted outside of the airport.

In at least one embodiment, the order fulfillment control unit limits a time period for the passenger to submit the order.

Certain embodiments of the present disclosure provide an aircraft dining method that is configured to allow a passenger for a scheduled flight of an aircraft to order one or more items from restaurants within an airport. The aircraft dining method includes receiving an order for an item from a restaurant within the airport from the passenger for the scheduled flight at an order fulfillment control unit so that the item is delivered to the aircraft or an area proximate to the aircraft prior to the aircraft departing the airport.

The aircraft dining method may also include contacting, with the order fulfillment control unit, the restaurant to prepare the item and have the item delivered to the aircraft or the area proximate to the aircraft prior to the aircraft departing the airport.

The aircraft dining method may also include submitting the order to an ordering control unit of an ordering device. The receiving may include receiving the order from the ordering control unit. The aircraft dining method may include using a user input device coupled to the ordering control unit to submit the order to the ordering control unit.

The aircraft dining method may include showing, on a display of the ordering device a flight information configured to prompt the passenger to input one or more of passenger name, flight number, or seat assignment, a restaurant option screen configured to prompt the passenger to pick the restaurant from a plurality of restaurants within the airport, a menu options screen configured to prompt the passenger to pick the item from one or more items, a service time screen configured to prompt the passenger to pick a preferred service time during the scheduled flight, and/or a payment screen configured to prompt the passenger to enter payment information.

The aircraft dining method may also include storing flight schedule data regarding the aircraft within a flight schedule database.

Certain embodiments of the present disclosure provide an aircraft dining system that is configured to allow a passenger for a scheduled flight of an aircraft to order one or more items from restaurants within an airport. The aircraft dining system includes an ordering device that includes an ordering control unit that is configured to allow a passenger for the scheduled flight to submit an order for an item from a restaurant within the airport so that the item is delivered to the aircraft or an area proximate to the aircraft prior to the aircraft departing the airport.

The ordering device may include a user input device coupled to the ordering control unit. The user input device configured to allow the passenger to submit the order to the ordering control unit. The ordering device further may include a display coupled to the ordering control unit.

Certain embodiments of the present disclosure provide an aircraft dining method that is configured to allow a passenger for a scheduled flight of an aircraft to order one or more items from restaurants within an airport. The aircraft dining method includes submitting, with an ordering device that includes an ordering control unit, an order for an item from a restaurant within the airport so that the item is delivered to the aircraft or an area proximate to the aircraft prior to the aircraft departing the airport.

BRIEF DESCRIPTION OF THE DRAWINGS

FIG. 3 illustrates a simplified front view of an ordering device, according to an embodiment of the present disclosure.

FIG. 4 illustrates a front view of a display of the ordering device showing a flight information screen, according to an embodiment of the present disclosure.

FIG. 5 illustrates a front view of the display of the ordering device showing a restaurant option screen, according to an embodiment of the present disclosure.

FIG. 6 illustrates a front view of the display of the ordering device showing a menu options screen, according to an embodiment of the present disclosure.

FIG. 7 illustrates a front view of the display of the ordering device showing a service time screen, according to an embodiment of the present disclosure.

FIG. 8 illustrates a front view of the display of the ordering device showing a payment screen, according to an embodiment of the present disclosure.

DETAILED DESCRIPTION OF THE DISCLOSURE

Figure 1:
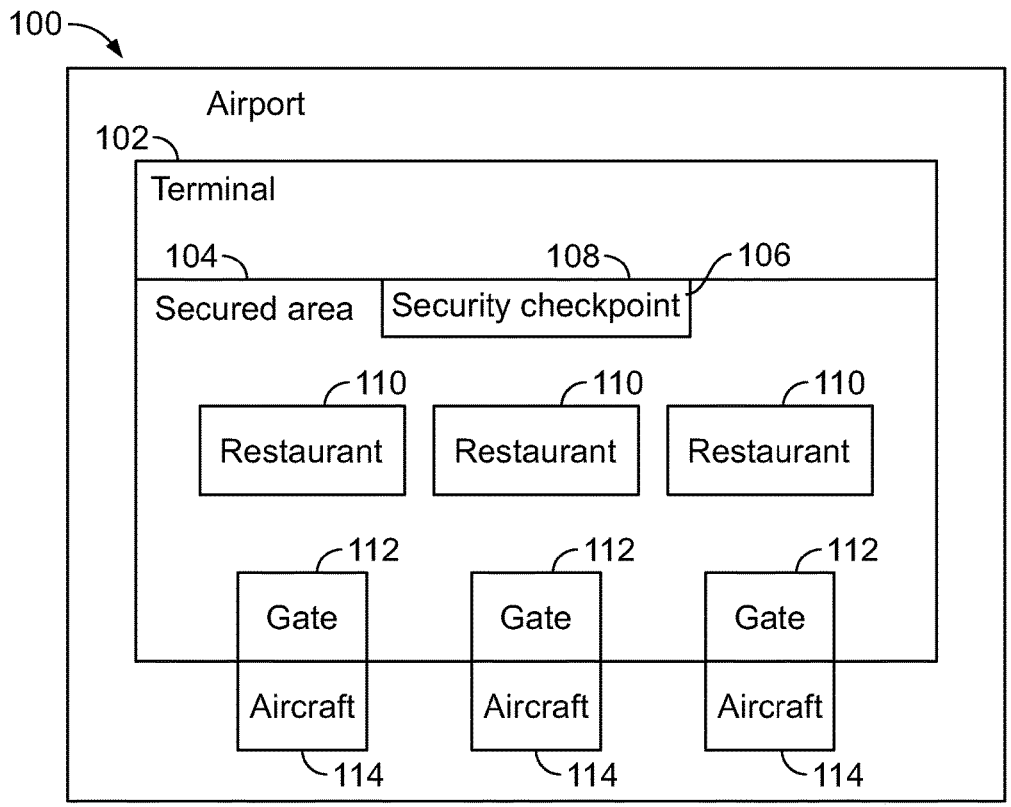
FIG. 1 is a schematic block diagram of an airport, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide an aircraft dining system and method that connects passengers with airport restaurants and allows them to choose meals from their favorite restaurants in place of current meal options served onboard an aircraft. In at least one embodiment, the passenger orders via an ordering device, which may include a program (such as an application). The passenger is able to order a customized meal and even choose what time they would like their meal to be served inflight.

Embodiments of the present disclosure enhance inflight dining experiences, provide ancillary revenue for airlines, and open up a new market for airport restaurants. The ordering process increases efficiency and lessens the amount of work done by the flight attendants. Further, customized meals reduce the amount of wasted items per flight, thereby decreasing the weight of the plane. Meal choices can also be tracked in order to provide passengers with customized recommendations and restaurants with pivotal data.

In at least one embodiment, a scheduled passenger chooses a meal from a list of available restaurants before a flight. The selected restaurant receives the order and prepares the meals before the flight. The prepared meal is packaged and delivered to the aircraft. For example, a caterer or delivery company may receive the prepared meal and deliver it to the aircraft on which the passenger is scheduled. In at least one embodiment, the passenger is allowed to choose a time for delivery of the meal during the flight.

Embodiments of the present disclosure allow flight attendants to take care of other duties, instead of preparing meals during a flight, and/or taking orders (and payment) from passengers. The flight attendants may deliver the meals to the passengers during a flight, but no longer need worry about preparation and presentation of the meals. Further, embodiments of the present disclosure may allow for ovens in galleys to be removed, thereby freeing up space for other needs.

As described herein, certain embodiments of the present disclosure provide an aircraft dining system and method that includes an order fulfiller. The order fulfiller includes an order fulfillment control unit that is configured to receive an order from a passenger scheduled for a flight on aircraft (for example, an individual scheduled to fly on a particular aircraft that departs an airport) for an item from a restaurant within the airport so that the item is delivered to the aircraft or an area proximate to the aircraft (such as a gate at which the aircraft is to depart from) prior to the aircraft departing from the airport. In at least one embodiment, the order fulfiller contacts the restaurant to prepare the item, and have the item delivered to the aircraft or the area proximate to the aircraft prior to the aircraft departing from the airport.

In at least one embodiment, catering services may pick up the orders from the restaurants in the airport. The catering services ensure that the orders are secured and transferred to the aircraft on which the passengers who placed the orders will be located. For example, the catering services may load the orders on secure carts that are then transported to the aircraft. In at least one other embodiment, the restaurants may deliver the orders to a central location at which a catering service collects and transports the orders to the aircraft.

Certain embodiments of the present disclosure provide an aircraft dining system and method that includes an ordering device that includes an ordering control unit that is configured to receive an order from a passenger scheduled for a flight on an aircraft for an item from a restaurant within the airport so that the item is delivered to the aircraft proximate to the aircraft prior to the aircraft departing from the airport. The ordering device includes a user input device that allows the passenger to submit the order to the ordering control unit.

FIG. 1 is a schematic block diagram of an airport 100, according to an embodiment of the present disclosure. The airport 100 includes one or more terminals 102. While one terminal 102 is shown in FIG. 1, it is to be understood that the airport 100 may include two or more terminals 102.

The terminal 102 includes a secured area 104 having one or more security checkpoints 106 at an entrance 108. While one securing checkpoint 106 at an entrance 108 is shown in FIG. 1, it is to be understood that the secured area 104 may include multiple securing checkpoints 106 and multiple entrances 108.

Individuals, such as passengers, airport employees, airline employees, and/or the like pass through the security checkpoint 106 (and associated security and screening systems and methods) before entering into the secured area 104. Further, the belongings (such as carry-on bags) of the individuals also pass through the security checkpoint 106 (and are screened) before entering into the secured area 104.

One or more restaurants 110 are within the secured area 104. In at least one embodiment, the secured area 104 includes a plurality of restaurants 110, each of which differs from another. For example, each of the restaurants 110 may be located at a different area of the secured area 104. The restaurants 110 may be full service restaurants with waiters, waitresses, cooks, and the like, fast service stands within the secured area 104, self-service vending systems, and/or the like. The restaurants 110 are configured to be patronized by individuals within the airport 100. Because the restaurants 110 are within the secured area 104, individuals and items (such as food and beverages) within the restaurants 110 have passed through the security checkpoint 106, and are therefore presumed safe within the secured area 104. One or more of the restaurants 110 may or may not be associated with an airline or other such aircraft operator. Individuals within the secured area 104 may order items offered by the restaurants 110 (and prepared at the restaurants) and consume the items within the restaurants 110. The secured area 104 may include more or less restaurants 110 than shown. The items may be or include meals (including entrees and sides), entrees, sides, snacks, desserts, beverages, and the like.

Gates 112 are also within the secured area 104. Aircraft 114 may taxi to and from the gates 112. Individuals, such as passengers, board onto and depart from the aircraft 114 via the gates 112. The secured area 104 may include more or less gates 112 than shown.

As described herein, embodiments of the present disclosure provide aircraft dining systems and methods that allow passengers to order items offered by the restaurants 110 (and prepared at the restaurants 110) within the secured area 104. After the items are ordered from the restaurants 110, the items are delivered to the aircraft 114 of the passengers that ordered the items. The passengers are then able to enjoy the items of their choosing during their flights.

Figure 2:
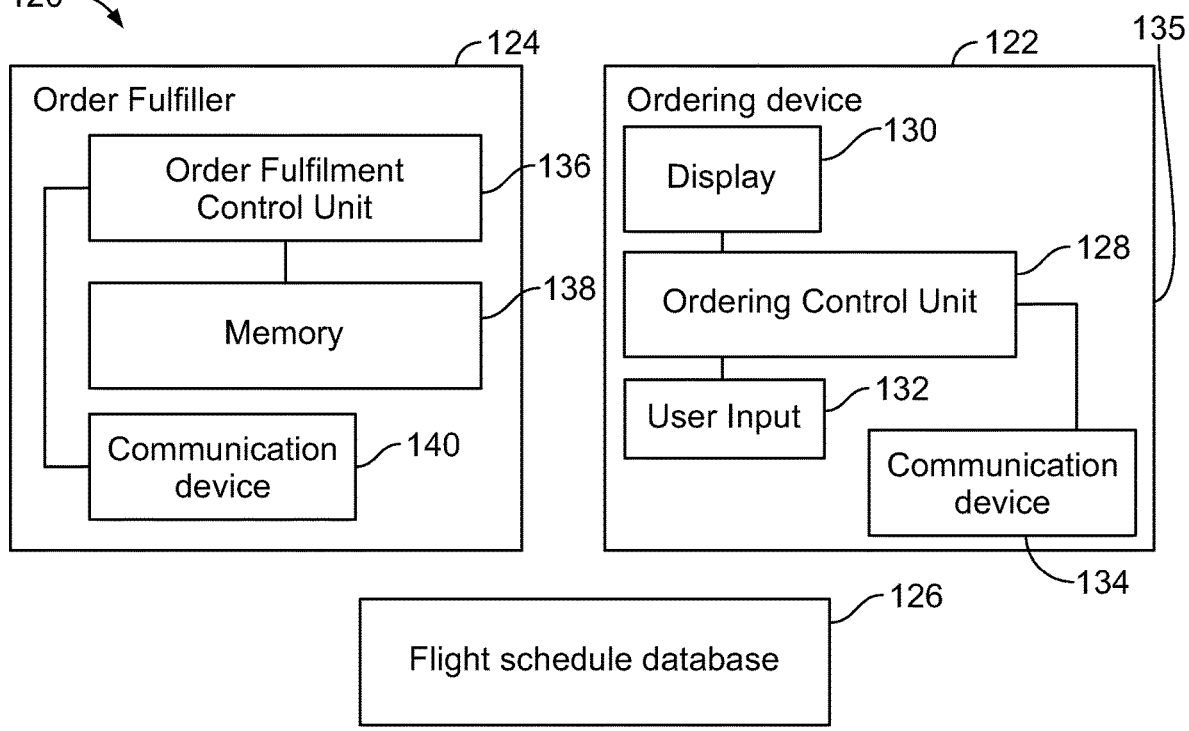
FIG. 2 is a schematic block diagram of an aircraft dining system, according to an embodiment of the present disclosure.

FIG. 2 is a schematic block diagram of an aircraft dining system 120, according to an embodiment of the present disclosure. The aircraft dining system 120 includes an ordering device 122 in communication with an order fulfiller 124. The aircraft dining system 120 may also include a flight schedule database 126.

The ordering device 122 includes an ordering control unit 128 operatively coupled to a display 130, a user input 132, and a communication device 134, which may be secured to and/or within a housing 135. The ordering control unit 128 is electrically coupled to the display 130, the user input 132, and the communication device 134, such as through one or more wired or wireless connections.

In at least one embodiment, the ordering device 122 may be a handheld device, such as a smart phone or tablet of a passenger. In at least one other embodiment, the ordering device 122 may be a personal or laptop computer. In at least one other embodiment, the ordering device 122 may be a kiosk within the terminal 102. In at least one other embodiment, the ordering device 122 may be or part of an inflight entertainment or user interface system within the aircraft, such as secured to a headrest, armrest, and/or the like. Referring to FIGS. 1 and 2, the ordering device 122 may or may not be in the airport 100.

The display 130 may be a monitor, screen, touchscreen interface, and/or the like. The user input 132 may be a touchscreen interface (and, as such part of the display 130), a keyboard, a mouse, a stylus, and/or the like. The user input 132 allows a passenger to submit an order to the ordering control unit 128. In at least one embodiment, the order includes passenger information, flight information, a choice of restaurant, and a choice of item(s) from the chosen restaurant. The order may also include a chosen service time for the item(s) during a flight.

The communication device 134 may be or include one or more antennas, transceivers, Internet or Ethernet connections, WiFi connections, other such wired or wireless connections, and/or the like. The communication device 134 allows the ordering device 122 to communicate with the order fulfiller 124 and/or the flight schedule database 126, such as via wireless (and/or wired) connections.

The order fulfiller 124 includes an order fulfillment control unit 136 operatively coupled to a memory 138 and a communication device 140, such as through one or more wired or wireless connections. Similar to the communication device 134, the communication device 140 may be or include one or more antennas, transceivers, Internet or Ethernet connections, WiFi connections, other such wired or wireless connections, and/or the like. The communication device 140 allows the order fulfiller 124 to communicate with the ordering device 122 and/or the flight schedule database 126, such as via wireless (and/or wired) connections.

As shown, the order fulfiller 124 may be separate and distinct from the ordering device 122. In at least one other embodiment, the order fulfiller 124 may be part of the ordering device 122. For example, the ordering control unit 128 may include or otherwise subsume the order fulfiller. As an example, the order fulfillment control unit 136 and/or the memory 138 may be part of the ordering control unit 128.

Referring to FIGS. 1 and 2, the order fulfiller 124 may be within the airport 100. For example, the order fulfiller 124 may be within the secured area 104. In at least one other embodiment, the order fulfiller 124 may be remotely located from the airport 100.

The order fulfiller 124 may be associated with the restaurants 110 within the secured area 104. In at least one embodiment, each restaurant 110 within the secured area 104 is associated within a separate and distinct order fulfiller 124. Optionally, a single order fulfiller 124 may be associated with all of the restaurants 110.

The memory 138 stores menu data regarding the current offered items (such as meals, snacks, beverages, and/or the like) of the restaurants 110. For example, the order fulfillment control unit 136 is in communication with the restaurants 110 and stores the current offered items in the memory 138.

The flight schedule database 126 stores current flight schedules for the aircraft 114 at the airport 100. For example, departure and arrival times for the aircraft 114 are stored and continually updated in the flight storage database 126. Optionally, the aircraft dining system 120 may not include the flight schedule database 126.

Referring to FIGS. 1 and 2, in operation, a passenger uses the ordering device 122 to order items from the restaurants 110. Because the restaurants 110 are within the secured area 104, the items available from the restaurants 110 have already passed through the security checkpoint 106, and are presumed safe and secure. Accordingly, there is no need for items that are ordered by passengers to pass through another security checkpoint or screening, thereby allowing for quick, safe, and secure delivery to the aircraft 114. Alternatively, at least one of the restaurants 110 may be outside of the secured area 104. In this embodiment, items ordered from such restaurant would need to pass through the security checkpoint 106 before being delivered to the aircraft 114.

The ordering control unit 128 includes one or more programs (such as an application) that allow a passenger booked for a particular flight of an aircraft 114 (that is, a scheduled passenger) to order items offered by the restaurants 110. For example, the passenger engages the user input 132 to order one or more items from one or more restaurants 110. Initially, the passenger may input scheduled flight information (such as time of departure, seat assignment, and/or the like) into the ordering device via the user input 132. As the passenger engages the user input 132, the ordering control unit 128 shows the available restaurants 110 within the airport from which to choose items. The passenger then engages the user input 132 to choose a desired restaurant. The ordering control unit 128 then shows a menu of available items offered by the restaurant 110 on the display 130. The ordering control unit 128 may have a memory that stores data regarding the menu. Optionally, the ordering control unit 128 may communicate with the order fulfiller 124 to receive the data regarding the menu, which may be stored in the memory 138 of the order fulfiller 124.

The passenger may then engage the user input 132 to pick one or more desired items from the menu on the display 130, which are then associated with the scheduled flight information. In at least one embodiment, the scheduled flight information may automatically be associated with the passenger, such as via the ordering control unit 128 and/or the order fulfillment control unit 136 accessing flight schedule data from the flight schedule database 126.

The passenger may also pick a desired time during a schedule flight for the items to be delivered. The passenger may then engage the user input 132 to pay for the items chosen from the menu, such as via a credit card. After the items from the menu are picked (and a time for service during the flight is optionally picked), the ordering control unit 128 communicates with the order fulfillment control unit 136 to fulfill the order (which includes the chosen items and/or the desired time for service during a scheduled flight). The order fulfillment control unit 136 then communicates with the restaurant 110 to fulfill the order.

After the restaurant 110 receives the order from the order fulfiller 124, staff at the restaurant prepares the items that have been chosen by the passenger operating the ordering device 122. The items may be cooked, chilled, prepared for presentation, and/or the like at the restaurant 110, as opposed to onboard an aircraft 114. After the items are prepared and ready for delivery, the items may be loaded onto a cart, which is then delivered to the aircraft 114 of the passenger who ordered the items. For example, a caterer or delivery company within the secured area may deliver the ordered items to the aircraft 114 of the passenger. The items are secured within a package that identifies the passenger (such as via seat assignment and/or name), as well as any delivery and/or service instructions (such as time of service during a flight instructions). Accordingly, a flight attendant may deliver the items ordered by the passenger from the restaurant 110 during a flight.

In at least one embodiment, the passenger may select items offered by the restaurant 110 during a flight booking process. That is, as the passenger books a flight days, weeks, months, etc. in advance of the departure date, such as via the ordering device 122, the display 130 may show the available restaurants 110 at the airport 100, and the passenger may pre-select desired items from a desired restaurant at the time the flight is booked.

In at least one embodiment, the passenger may select items during the day of a scheduled flight. For example, the passenger may order one or more items from one or more restaurants via the ordering device 122 before arrival at the airport, or a predetermined time period before the flight is scheduled to depart.

As an example, the flight schedule database 126 stores data regarding a flight schedule in order to allow for a determination as to if and when an order may be delivered prior to the aircraft 114 departing from the airport 100. In at least one embodiment, the order fulfillment control unit 136 (and/or the ordering control unit 128) limits a time period for the passenger to submit the order. The order fulfillment control unit 136 may allow passengers to order items offered by the restaurants 110 only up to a certain time period before a flight is scheduled to depart in order to ensure delivery of the items before the flight takes off. As an example, the order fulfillment control unit 136 and/or the ordering control unit 128 (which may be in communication with the flight schedule database 126) may allow passengers to order items offered by the restaurants 110 up to an hour before departure, after which the order fulfillment control unit 136 may prevent ordering, or allow for ordering of a limited number of menu options. As an example, if the passenger attempts to order within an hour from a flight departure, the ordering control unit 128 and/or the order fulfillment control unit 136 may provide a limited amount of menu options that are able to be delivered before flight departure from the airport 100.

FIG. 3 illustrates a simplified front view of the ordering device 122 according to an embodiment of the present disclosure. The ordering device 122 may be a handheld device of a passenger, such as a smart phone, table, or the like. As shown, the display 130 may provide a touchscreen interface, which serves as the user input 132.

FIG. 4 illustrates a front view of the display 130 of the ordering device 122 showing a flight information screen 150, according to an embodiment of the present disclosure. The ordering control unit 128 (shown in FIG. 2) is configured to show the flight information screen 150 on the display 130. The flight information screen 150 prompts a passenger to input one or more of passenger name 152, flight number 154, and/or seat assignment 156 in order to associate the ordering passenger with a particular flight to which ordered items will be delivered.

FIG. 5 illustrates a front view of the display 130 of the ordering device 122 showing a restaurant option screen 158, according to an embodiment of the present disclosure. The ordering control unit 128 (shown in FIG. 2) is configured to show the restaurant option screen 158 on the display 130. The restaurant option screen 158 shows restaurant options 160 available from which the passenger may order items. The passenger is prompted via the restaurant option screen 158 to pick a restaurant 110 (shown in FIG. 1) within the airport 100 from which to order one or more items.

FIG. 6 illustrates a front view of the display 130 of the ordering device 122 showing a menu options screen 162, according to an embodiment of the present disclosure. The ordering control unit 128 (shown in FIG. 2) is configured to show the menu options screen 162 on the display 130. The menu options screen 162 provides various items 164 that the passenger may choose. The passenger is prompted via the menu options screen 162 to pick one or more items from the listed items 164.

FIG. 7 illustrates a front view of the display 130 of the ordering device 122 showing a service time screen 166, according to an embodiment of the present disclosure. The ordering control unit 128 (shown in FIG. 2) is configured to show the service time screen 166 on the display 130. The service time screen 166 provides various service times 168 for the chosen items during the flight. The service times 168 are the times when the items ordered by the passenger are provided to the passenger within the aircraft 114, such as by a flight attendant. The passenger is prompted via the service time screen 166 to pick a preferred service time during the scheduled flight. Optionally, the ordering device 122 may not show a service time screen 166.

FIG. 8 illustrates a front view of the display 130 of the ordering device 122 showing a payment screen 170, according to an embodiment of the present disclosure. The ordering control unit 128 (shown in FIG. 2) is configured to show the payment screen 170 on the display 130. The payment screen 170 prompts the passenger to enter payment information 172 to pay for the chosen item(s).

Figure 9:
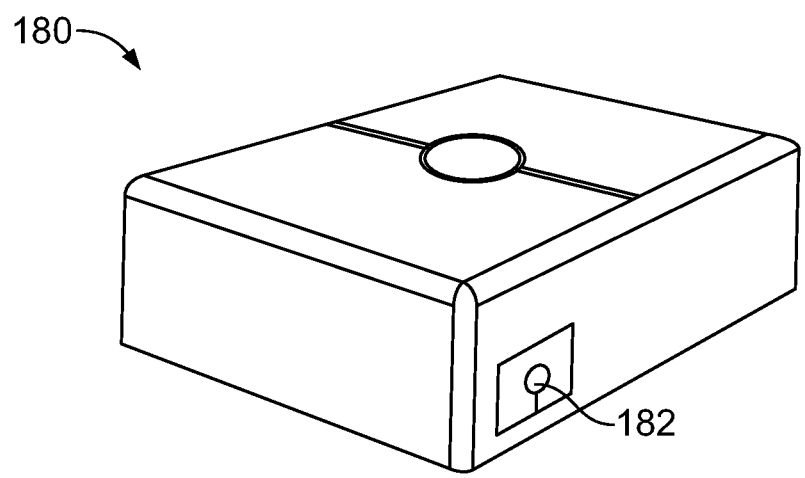
FIG. 9 illustrates a perspective top view of a package, according to an embodiment of the present disclosure.

FIG. 9 illustrates a perspective top view of a package 180, according to an embodiment of the present disclosure. Referring to FIGS. 1-9, after the passenger orders one or more desired items from a desired restaurant 110, the restaurant 110 prepares, presents, and places the items within the package 180. The package 180 may be configured to be retained within a galley cart, which may be placed within a galley of the aircraft 114. The package 180 may include indicia 182, which identifies the passenger information of the passenger who ordered the item(s) within the package 180, so that the package 180 may delivered to the correct aircraft and delivered by a flight attendant to the passenger during the flight. The indicia 182 may be or include a decal, sticker, writing, a radio frequency identification (RFID) tag, and/or the like.

Optionally, the package 180 may be delivered to the gate 112 so that the passenger may pick up the package 180 at the gate 112 before boarding the aircraft 114. For example, the package 180 may be delivered and positioned within a locker at or proximate the gate 112. The passenger may be informed of the precise locker location on the display 130 of the ordering device 122. The locker may have a unique unlocking code, which is also sent to the ordering device 122 and shown on the display 130. In at least one other embodiment, the lockers may be onboard the aircraft 114, at which the passengers may pick up their ordered items.

In at least one embodiment, the packages 180 may be loaded onto an automated delivery truck, which may be robotically operated. For example, the delivery truck may be unmanned and include a navigation system along with an automated motive system that automatically delivers the ordered items to the gates 112 and/or the aircraft 114 without human intervention.

Figure 10:
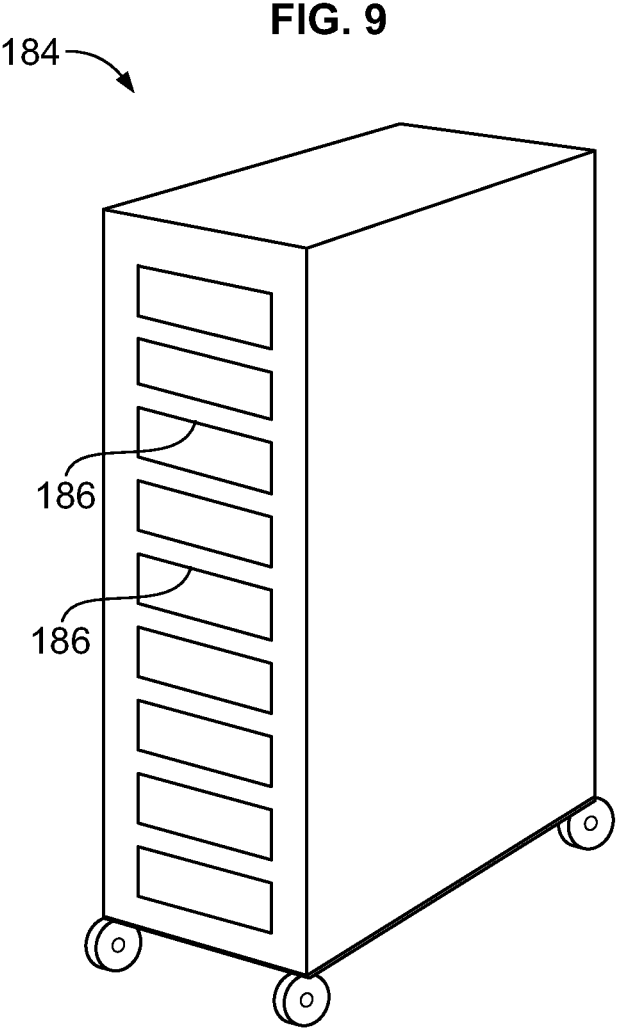
FIG. 10 illustrates a perspective front view of a cart, according to an embodiment of the present disclosure.

FIG. 10 illustrates a perspective front view of a cart 184, according to an embodiment of the present disclosure. The cart 184 may be a galley cart that is configured to be moveably positioned within an interior cabin of an aircraft 114. The cart 184 includes a plurality of compartments 186, each of which may receive and removably retain a package 180, such as shown in FIG. 9.

Figure 11:
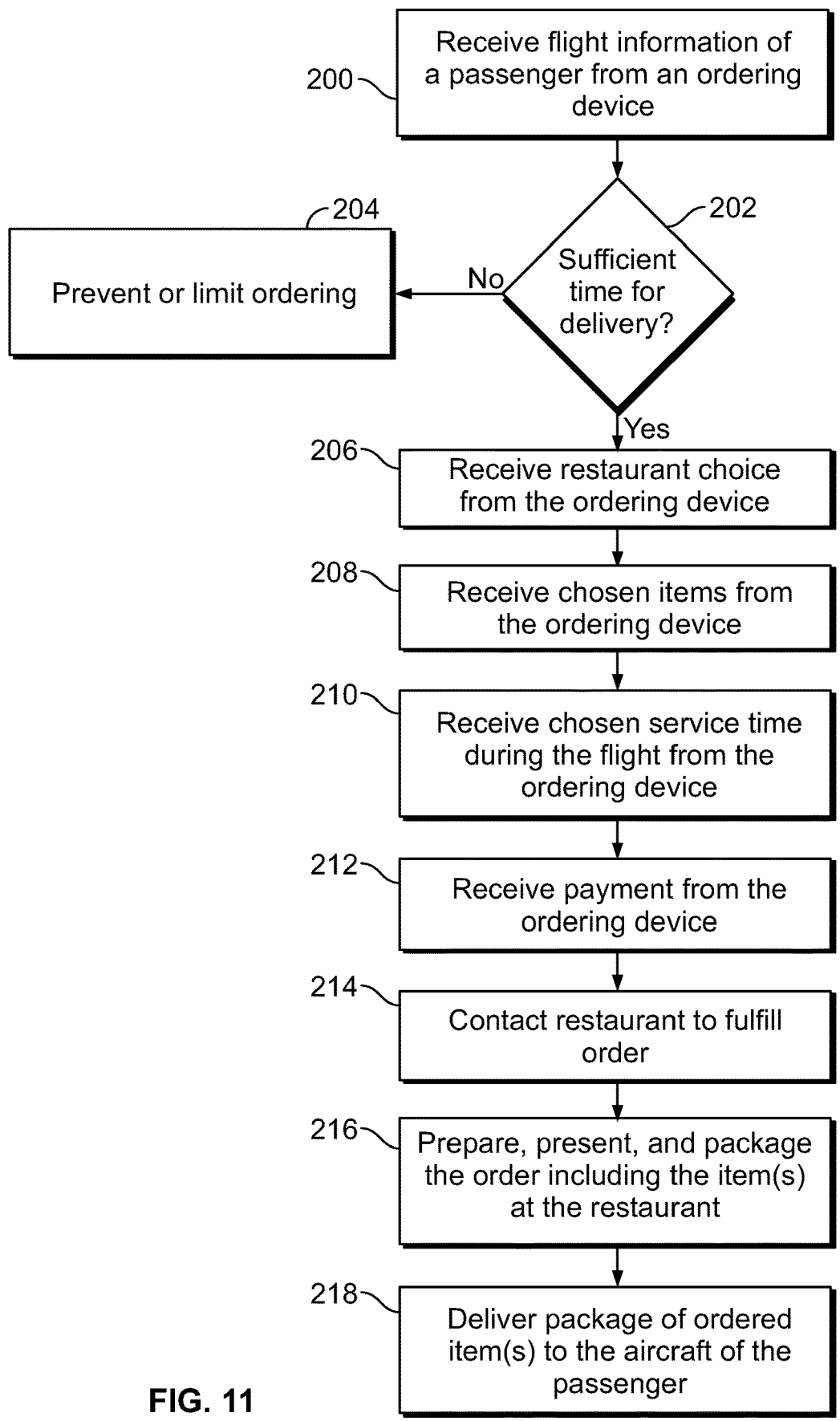
FIG. 11 illustrates a flow chart of an aircraft dining method, according to an embodiment of the present disclosure.

FIG. 11 illustrates a flow chart of an aircraft dining method, according to an embodiment of the present disclosure. Referring to FIGS. 1-11, at 200, an order fulfillment control unit 136 receives flight information of a passenger from the ordering device 122. For example, the passenger may input the flight information through the flight information screen 150, shown in FIG. 4.

At 202, it is determined if there is sufficient time for delivery to the aircraft 114 on which the passenger is scheduled, based on the scheduled departure time. For example, the order fulfillment control unit 136 and/or the ordering control unit 128 may communicate with the flight schedule database 126 to determine the scheduled departure time for the aircraft 114 of the passenger, and determine if there is sufficient time for delivery to the aircraft 114. If there is not sufficient time for delivery, the order fulfillment control unit 136 and/or the ordering control unit 128 may prevent or limit ordering at 204.

If, however, there is sufficient time for delivery, at 206, the order fulfillment control unit 136 receives a restaurant choice of the passenger (such as entered via the restaurant options screen 158) from the ordering device 122. At 208, the order fulfillment control unit 136 receives items chosen by the passenger (such as entered via the menu options screen 162) from the ordering device 122. At 210, the order fulfillment control unit 136 may optionally receive a chosen service time during the flight of the passenger (such as entered via the service time screen 166) from the ordering device 122. At 212, the order fulfillment control unit 136 may receive payment (such as entered via the payment screen 170) from the ordering device 122.

At 214, the order fulfillment control unit 136 then contacts the restaurant 110 to full fill the order. At 216, the restaurant receives the order, and prepares (including cooking, heating, cooling, etc.), presents (including positioning on plates, bowls, providing utensils, etc.), and packages the order including the item(s) at the restaurant 110 (as opposed to the aircraft 114). At 218, the package of ordered item(s) is then delivered to the aircraft 114 of the passenger.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the ordering control unit 128 and the order fulfillment control unit 136 may be or include one or more processors that are configured to control operation thereof, as described herein.

The ordering control unit 128 and the order fulfillment control unit 136 are configured to execute a set of instructions that are stored in one or more data storage units or elements (such as one or more memories), in order to process data. For example, the ordering control unit 128 and the order fulfillment control unit 136 may include or be coupled to one or more memories. The data storage units may also store data or other information as desired or needed. The data storage units may be in the form of an information source or a physical memory element within a processing machine.

The set of instructions may include various commands that instruct the ordering control unit 128 and the order fulfillment control unit 136 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the ordering control unit 128 and the order fulfillment control unit 136. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the ordering control unit 128 and the order fulfillment control unit 136 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-11, embodiments of the present disclosure provide systems and methods that allow large amounts of data to be quickly and efficiently analyzed by one or more computing devices. For example, numerous aircraft 114 that transport numerous passengers may be scheduled to depart from the airport 100. As such, large amounts of data are being tracked and analyzed. In particular, numerous passengers scheduled for numerous flights over one or more days, weeks, months, or longer may opt to order from the restaurants 110 within the airport 100. The vast amounts of data are efficiently organized and/or analyzed by the order fulfilling control unit 136, as described herein. The order fulfillment control unit 136 and/or the ordering control unit 128 analyzes the data in a relatively short time in order to quickly and efficiently coordinate delivery of items to the aircraft 114, for example. A human being would be incapable of efficiently analyzing such vast amounts of data in such a short time for numerous passengers. As such, embodiments of the present disclosure provide increased and efficient functionality, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing, particularly with respect to times for delivery before the aircraft 114 depart from the airport 100.

Figure 12:
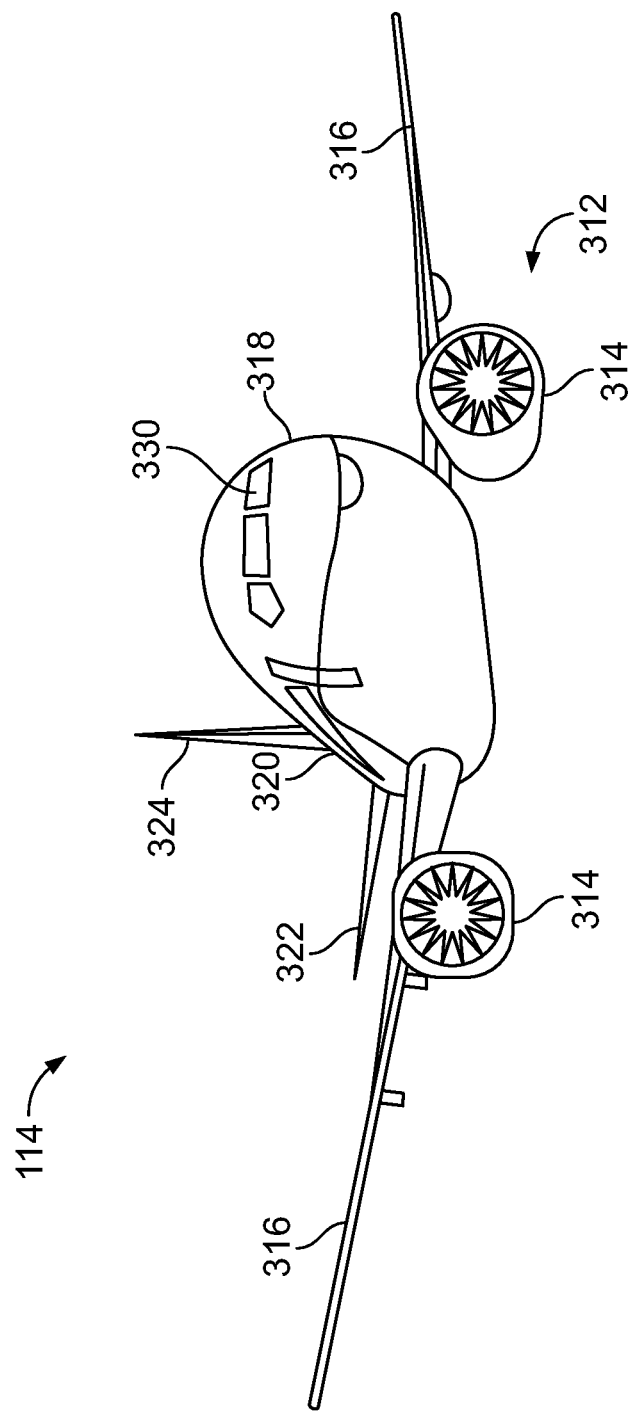
FIG. 12 illustrates a front perspective view of an aircraft, according to an exemplary embodiment of the present disclosure.

FIG. 12 illustrates a front perspective view of an aircraft 114, according to an exemplary embodiment of the present disclosure. The aircraft 114 includes a propulsion system 312 that may include two turbofan engines 314, for example. Optionally, the propulsion system 312 may include more engines 314 than shown. The engines 314 are carried by wings 316 of the aircraft 114. In other embodiments, the engines 314 may be carried by a fuselage 318 and/or an empennage 320. The empennage 320 may also support horizontal stabilizers 322 and a vertical stabilizer 324. The fuselage 318 of the aircraft 114 defines an internal cabin, which may include a cockpit 330. Passengers that are scheduled to fly on the aircraft 114 may order items from the restaurants 110 within the airport 100 (shown in FIG. 1) before the aircraft 114 departs from the airport 100, as described herein. The aircraft 114 may be sized, shaped, and configured other than shown in FIG. 12.

As described herein, embodiments of the present disclosure provide systems and methods for providing passengers aboard an aircraft with a greater number of food and beverage options during a flight. Further, embodiments of the present disclosure provide systems and methods for allowing passengers aboard an aircraft to select meals of their specific choosing. Additionally, embodiments of the present disclosure provide efficient systems and methods for coordinating meals onboard on aircraft that allow flight attendants to perform various other tasks.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. An aircraft dining system that is configured to allow passengers for a scheduled flight of an aircraft to order one or more items from restaurants within an airport, the aircraft dining system comprising:
   an order fulfiller including an order fulfillment control unit that is configured to receive orders for items offered by one or more restaurants within the airport from the passengers for the scheduled flight so that the items are delivered to the aircraft or an area proximate to the aircraft prior to the aircraft departing the airport;
   packages that are configured to retain the items that are ordered, wherein the items are prepared at the restaurant and secured in the packages;
   a cart that is configured to receive the packages for the passengers, wherein the cart is configured to deliver the items that are ordered and retained within the packages to the aircraft or the area proximate to the aircraft; and
   an automated unmanned delivery truck that includes the cart having the packages for the passengers, wherein the automated unmanned delivery truck includes an automated motive system that automatically delivers the cart to the aircraft or the area proximate to the aircraft.

2. The aircraft dining system of claim 1, wherein the area proximate to the aircraft is a gate within the airport.

3. The aircraft dining system of claim 1, wherein the order fulfillment control unit is further configured to contact the one or more restaurants to prepare the items and have the items delivered to the aircraft or the area proximate to the aircraft prior to the aircraft departing the airport.

4. The aircraft dining system of claim 1, further comprising ordering devices, wherein each of the ordering devices includes an ordering control unit that is configured to allow one of the passengers to submit one of the orders, the ordering control unit being in communication with the order fulfillment control unit.

5. The aircraft dining system of claim 4, wherein each of the ordering devices further comprises a user input device coupled to the ordering control unit, the user input device configured to allow one of the passengers to submit one of the orders to the ordering control unit.

6. The aircraft dining system of claim 4, wherein the ordering device further comprises a display coupled to the ordering control unit.

7. The aircraft dining system of claim 6, wherein the ordering control unit is configured to show a flight information screen on the display, the flight information screen configured to prompt one of the passengers to input one or more of passenger name, flight number, or seat assignment.

8. The aircraft dining system of claim 6, wherein the ordering control unit is configured to show a restaurant option screen on the display, the restaurant option screen configured to prompt one of the passengers to pick one of the restaurants within the airport.

9. The aircraft dining system of claim 6, wherein the ordering control unit is configured to show a menu options screen on the display, the menu options screen configured to prompt one of the passengers to pick the item from one or more items.

10. The aircraft dining system of claim 6, wherein the ordering control unit is configured to show a service time screen on the display, the service time screen configured to prompt one of the passengers to pick a preferred service time during the scheduled flight.

11. The aircraft dining system of claim 6, wherein the ordering control unit is configured to show a payment screen, the payment screen configured to prompt one of the passengers to enter payment information.

12. The aircraft dining system of claim 1, wherein the restaurant is within a secured area of the airport.

13. The aircraft dining system of claim 1, further comprising a flight schedule database that stores flight schedule data regarding the aircraft.

14. The aircraft dining system of claim 1, wherein each of the orders comprises passenger information, flight information, a choice of one of the restaurants, and a choice of the item offered by the one of the restaurants.

15. The aircraft dining system of claim 14, wherein each of the orders further comprises a chosen service time for the item during a flight.

16. The aircraft dining system of claim 1, wherein at least one of the orders is submitted at a time the scheduled flight is booked.

17. The aircraft dining system of claim 1, wherein at least one of the orders is submitted at the airport.

18. The aircraft dining system of claim 1, wherein at least one of the orders is submitted outside of the airport.

19. The aircraft dining system of claim 1, wherein the order fulfillment control unit limits a time period for the passengers to submit the orders.

20. An aircraft dining method that is configured to allow passengers for a scheduled flight of an aircraft to order items from restaurants within an airport, the aircraft dining method comprising:
receiving, by an order fulfillment control unit, orders for items from one or more restaurants within the airport from the passengers for the scheduled flight so that the items are delivered to the aircraft or an area proximate to the aircraft prior to the aircraft departing the airport;
preparing the items that are ordered at the one or more restaurants;
securing the items that are ordered in packages;
retaining the items that are ordered in the packages;
receiving the packages in a cart; and
delivering the items that are ordered by the passengers and retained in the packages via the cart to the aircraft or the area proximate to the aircraft, wherein the delivering comprises automatically delivering the items by an automated unmanned delivery truck that includes the cart.

21. The aircraft dining method of claim 20, further comprising contacting, with the order fulfillment control unit, the one or more restaurants to prepare the items and have the items delivered to the aircraft or the area proximate to the aircraft prior to the aircraft departing the airport.

22. The aircraft dining method of claim 20, further comprising submitting the orders to ordering control units of ordering devices, wherein the receiving comprises receiving the orders from the ordering control units.

23. The aircraft dining method of claim 22, further comprising using user input devices coupled to the ordering control units to submit the orders to the ordering control units.

24. The aircraft dining method of claim 22, further comprising showing, on displays of the ordering devices:
a flight information configured to prompt the passengers to input one or more of passenger name, flight number, or seat assignment;
a restaurant option screen configured to prompt the passengers to pick one of the restaurants within the airport;
a menu options screen configured to prompt the passengers to pick the items;
a service time screen configured to prompt the passengers to pick preferred service times during the scheduled flight; and
a payment screen configured to prompt the passengers to enter payment information.

25. The aircraft dining method of claim 20, wherein the restaurants are within a secured area of the airport.

26. The aircraft dining method of claim 20, further comprising storing flight schedule data regarding the aircraft within a flight schedule database.

27. The aircraft dining method of claim 20, wherein each of the orders comprises passenger information, flight information, a choice of the restaurants, and a choice of the items offered by the restaurants.

28. The aircraft dining method of claim 27, wherein the orders further comprise chosen service times for the items during a flight.

29. The aircraft dining method of claim 20, further comprising submitting at least one of the orders when the scheduled flight is booked.

30. The aircraft dining method of claim 20, further comprising submitting at least one of the orders at the airport.

31. The aircraft dining method of claim 20, further comprising limiting, by the order fulfillment control unit, a time period for the passengers to submit the orders.

32. An aircraft dining system that is configured to allow passengers for a scheduled flight of an aircraft to order items from restaurants within an airport, the aircraft dining system comprising:
ordering devices, wherein each of the ordering devices includes an ordering control unit that is configured to allow a passenger for the scheduled flight to submit an order for an item from a restaurant within the airport so that the item is delivered to the aircraft or an area proximate to the aircraft prior to the aircraft departing the airport;
packages that are configured to retain items that are ordered by the passengers, wherein the items are prepared at one or more of the restaurants and secured in the packages;
a cart that is configured to receive the packages for the passengers, wherein the cart is configured to deliver the items that are ordered and retained within the packages to the aircraft or the area proximate to the aircraft; and
an automated unmanned delivery truck that includes the cart, wherein the automated unmanned delivery truck includes an automated motive system that automatically delivers the cart retaining the packages for the passengers to the aircraft or the area proximate to the aircraft.

33. The aircraft dining system of claim 32, wherein each of the ordering devices further comprises a user input device coupled to the ordering control unit, the user input device configured to allow the passenger to submit the order to the ordering control unit.

34. The aircraft dining system of claim 32, wherein each of the ordering devices further comprises a display coupled to the ordering control unit.

35. The aircraft dining system of claim 34, wherein the ordering control unit is configured to show a flight information screen on the display, the flight information screen configured to prompt the passenger to input one or more of passenger name, flight number, or seat assignment.

36. The aircraft dining system of claim 35, wherein the ordering control unit is configured to show a restaurant option screen on the display, the restaurant option screen configured to prompt the passenger to pick one of the restaurants within the airport.

37. The aircraft dining system of claim 35, wherein the ordering control unit is configured to show a menu options screen on the display, the menu options screen configured to prompt the passenger to pick the item from one or more items.

38. The aircraft dining system of claim 35, wherein the ordering control unit is configured to show a service time screen on the display, the service time screen configured to prompt the passenger to pick a preferred service time during the scheduled flight.

39. The aircraft dining system of claim 35, wherein the ordering control unit is configured to show a payment screen, the payment screen configured to prompt the passenger to enter payment information.

40. The aircraft dining system of claim 32, wherein the orders comprise passenger information, flight information, a choice of the restaurants, and a choice of the items offered by the restaurants.

41. The aircraft dining system of claim 40, wherein the orders further comprise chosen service times for the items during a flight.

42. The aircraft dining system of claim 32, wherein at least one of the passengers submits at least one of the orders upon booking the scheduled flight.

43. An aircraft dining method that is configured to allow passengers for a scheduled flight of an aircraft to order items from restaurants within an airport, the aircraft dining method comprising:
   submitting, with ordering devices that include ordering control units, orders for items item from one or more restaurants within the airport so that the items are delivered to the aircraft or an area proximate to the aircraft prior to the aircraft departing the airport;
   preparing the items that are ordered at the one or more restaurants;
   securing the items ordered by the passengers in packages;
   retaining the items that are ordered in the packages;
   receiving the packages for the passengers in a cart; and
   delivering the items that are ordered and retained in the package via the cart to the aircraft or the area proximate to the aircraft, wherein the delivering comprises automatically delivering the items by an automated unmanned delivery truck that includes the cart.

44. The aircraft dining system of claim 1, wherein the packages comprise indicia that identifies the passengers and service instructions.

45. The aircraft dining system of claim 1, further comprising lockers at or proximate a gate where the aircraft is or is schedule to be located, wherein the lockers configured to receive the packages from the cart, and wherein the lockers have unique locking codes that are communicated to the passengers.

46. The aircraft dining system of claim 1, further comprising lockers within the aircraft, wherein the lockers are configured to receive the packages from the cart, and wherein the lockers have unique locking codes that are communicated to the passengers.

47. The aircraft dining method of claim 20, further comprising receiving the packages from the cart in lockers within the aircraft, wherein the lockers have unique locking codes that are communicated to the passengers.

48. The aircraft dining method of claim 20, wherein the packages comprise indicia that identifies the passengers and service instructions.

49. The aircraft dining method of claim 20, further comprising receiving the packages from the cart in lockers at or proximate a gate where the aircraft is or is schedule to be located, wherein the lockers have unique locking codes that are communicated to the passengers.

* * * * *